(12) United States Patent
Whitaker et al.

(10) Patent No.: US 6,905,341 B1
(45) Date of Patent: Jun. 14, 2005

(54) ACTIVE LEARNING FRAMEWORK

(75) Inventors: Elizabeth T. Whitaker, Atlanta, GA (US); Robert L. Simpson, Jr., Buford, GA (US)

(73) Assignee: NCR Corporation, Dayton, OH (US)

( * ) Notice: Subject to any disclaimer, the term of this patent is extended or adjusted under 35 U.S.C. 154(b) by 543 days.

(21) Appl. No.: 09/702,318

(22) Filed: Oct. 31, 2000

(51) Int. Cl.$^7$ ................................................ G09B 7/00
(52) U.S. Cl. ..................................... 434/323; 434/322
(58) Field of Search ............................... 434/323, 322, 434/335, 350, 353, 354, 362

(56) References Cited

U.S. PATENT DOCUMENTS

| | | | | |
|---|---|---|---|---|
| 5,310,349 | A | * | 5/1994 | Daniels ...................... 434/350 |
| 6,077,085 | A | * | 6/2000 | Parry ......................... 434/322 |
| 6,099,320 | A | * | 8/2000 | Papadopoulos ............. 434/322 |
| 6,149,441 | A | * | 11/2000 | Pellegrino ................... 434/350 |
| 6,201,948 | B1 | * | 3/2001 | Cook .......................... 434/350 |
| 6,302,698 | B1 | * | 10/2001 | Ziv-El ......................... 434/323 |
| 6,334,779 | B1 | * | 1/2002 | Siefert ......................... 434/322 |
| 6,347,333 | B2 | * | 2/2002 | Eisendrath .................. 709/217 |
| 6,353,447 | B1 | * | 3/2002 | Truluck ....................... 345/733 |

OTHER PUBLICATIONS

Rotten Tomatoes website: Mr. Driller reviews.*
"Game Rankings" website: Heroes of Might and Magic III.*

* cited by examiner

Primary Examiner—Kurt Fernstrom
(74) Attorney, Agent, or Firm—Gregory A. Welte

(57) ABSTRACT

A computer-assisted educational system. Educational courses are provided, comprising individual lessons. The lessons are stored at one, or more, servers, and are transmitted to remote computers over a network, such as an internet. Students utilize the remote computers to participate in the lessons. At any given time, the remote computer displays the lessons available to a student, so that, for a given course, the student is not held in lock-step with the other students, but may study the lesson's of the student's own choice. This freedom is subject to any requirements of certain lessons which require prerequisite lessons be completed. The prerequisites must be completed first.

11 Claims, 4 Drawing Sheets

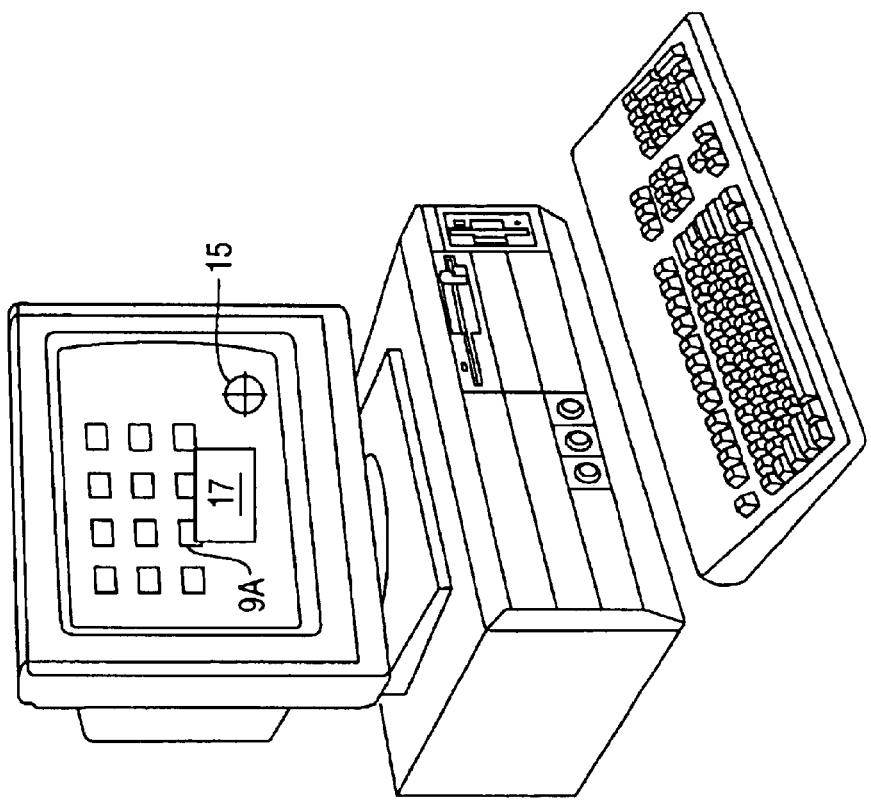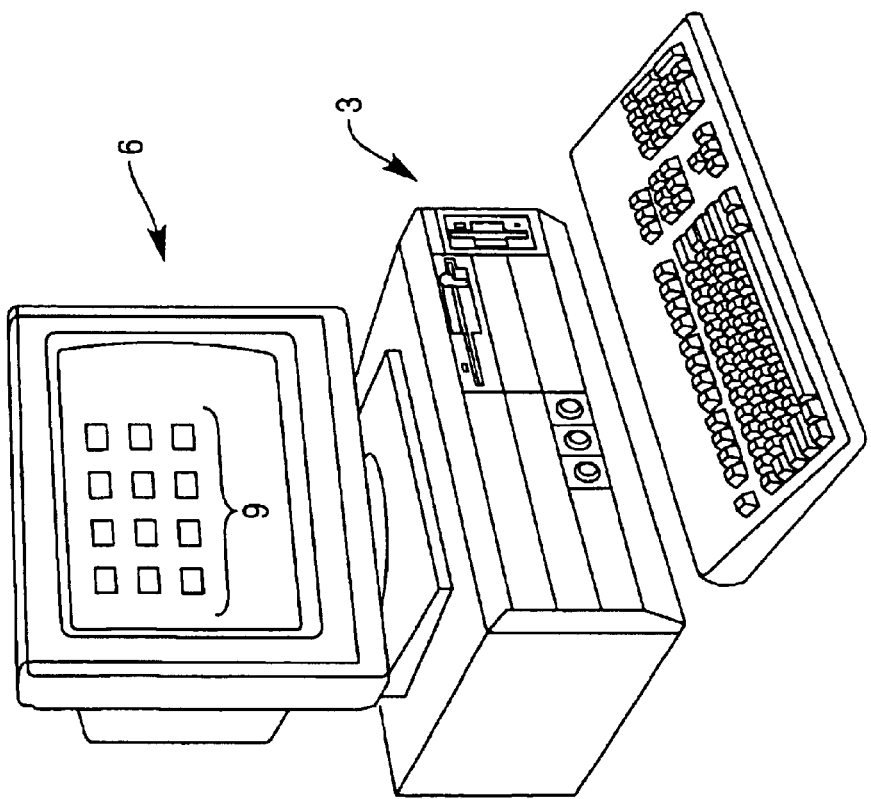

ACTIVE LEARNING FRAMEWORK

The invention concerns systems for presenting educational lessons over a network, including web-based training and e-Learning.

BACKGROUND OF THE INVENTION

Computer programs exist which present educational lessons to students. Commonly, the lessons are organized in a fixed sequence by the professor who prepared the lessons.

This fixity-of-sequence does not accommodate the inherent time-changing, and mutually inconsistent, interests of the minds of the students. For example, in a given academic term, many university students take an identical set of courses, such as Physics I, Chemistry I, French I, and English Literature I.

However, based on the background knowledge of the students, and their needs for extra information or practice, different students will undertake different types, and amounts, of work to complete a given course. That is, some students are better-prepared than others, and some learn, or work, faster than others.

Therefore, in general, when students are given a collection of assignments to perform, they do not attack the assignments in the same sequence, nor do they work on identical assignments at any given time. Consequently, the natural approach of students is not consistent with the fixity-of-sequence found in many educational computer systems.

The state of the art in computer-assisted education is such that little if any personalization is provided to accommodate the different backgrounds and learning styles evident in a diverse student population. In addition, computer-assisted education and training has the opportunity to offer students the chance to experience simulated events that allow the students to actively engage the virtual world in ways not possible or practical in real life. This opportunity has the potential to make computer-based education and training better than a book, better than a workbook and better than a video; i.e., alternative means of delivering information.

OBJECTS OF THE INVENTION.

An object of the invention is to provide an improved computer-assisted educational system over the current state of the art. The Active Learning Framework is an education and training system that engages the student in active learning as opposed to the passive reading of text or viewing of videos.

A further object of the invention is to provide a computer-assisted educational system that allows automated sequencing of a course of instruction based on a dynamic lesson plan built specifically for the individual student. This plan accounts for student differences in prior education experience, styles of learning (including learning disabilities) and preferences.

Another objective of the invention is to provide a flexible and reusable framework that permits learning materials to be decomposed into small fragments of content such that the content can be stored in a conventional database and served out dynamically in accordance to the real time needs of the individual students as they navigate through their personalized learning experience. As authors create new courses the content is linked to the presentation framework so that the same intelligent software can be used to present many different types of courses.

SUMMARY OF THE INVENTION

The invention is an intelligent software framework which allows for the presentation of many different courses using the same software but different content. The Active Learning Framework presents a set of lessons to a student, on a computer display. The set can be delivered in either an ordered list or in an unordered circle when choosing the next activity or lesson is part of the learning experience.

When the set is to be ordered, the presentation to the student is divided into at least two groups: (1) a first group, from which any lesson may be selected and completed and (2) a second group, containing sets of lessons. In the second group, the student can select only the lessons for which the student has completed the prerequisites: each set contains a collection of lessons which must be completed in sequence.

As the student completes the lessons, they are marked as completed on the display, or removed.

An intelligent agent (the Lesson Planning Agent) will dynamically provide the student with a lesson plan—a set of lessons that the student needs to complete in order to master the topic and pass the evaluation. The lesson plan will explicitly mark any of the lessons which the student has already seen, and any that teach concepts that the student has already shown the mastery of (through passing an evaluation) as available for possible review, but only if the student feels the need.

In addition, the lesson plan will add any lessons which teach concepts that the student needs for the course (prerequisite concepts) but which the student model shows that he or she has not mastered. There may be some lessons which teach concepts in which the student has a slight weakness, and these will be labeled as available for review if desired.

The lesson plans are dependent on the student model. The student model (stored in a database, built over time, and available by the system) contains information about the student's level of mastery of important concepts in the topic area. This information comes from student performance in previous courses as well as the current course. It may also contain information based on the background of the student (e.g., there are certain concepts which we expect all physicians to understand).

The student model is built by the Student Modeling Agent as the student interacts with the system over time.

Other agents include a student history agent and a performance agent for managing the number of agents available to monitor and react to student activities.

An Agent Communications Blackboard facilitates the passing of messages among agents allowing for collaboration in performing tasks. An agent may leave a message on the blackboard for any other agent or for all agents. Each agent regularly examines the blackboard for new messages. This supports flexible interchange of information. This is an approach that has been effective in distributed AI systems and in agent architectures.

It is important to understand that the agents are modular, and they contain knowledge that reflects and supports the policy of the organization providing the training. Because of the modularity of the agent architecture, the knowledge in the agents can easily be replaced by rules pertinent to the organization. A consideration in determining the behavior of the agents should be the content of the lessons and the user type.

BRIEF DESCRIPTION OF THE DRAWINGS

FIGS. 1 and 2 illustrate two forms of the invention.

DETAILED DESCRIPTION OF THE INVENTION

Figure 3:
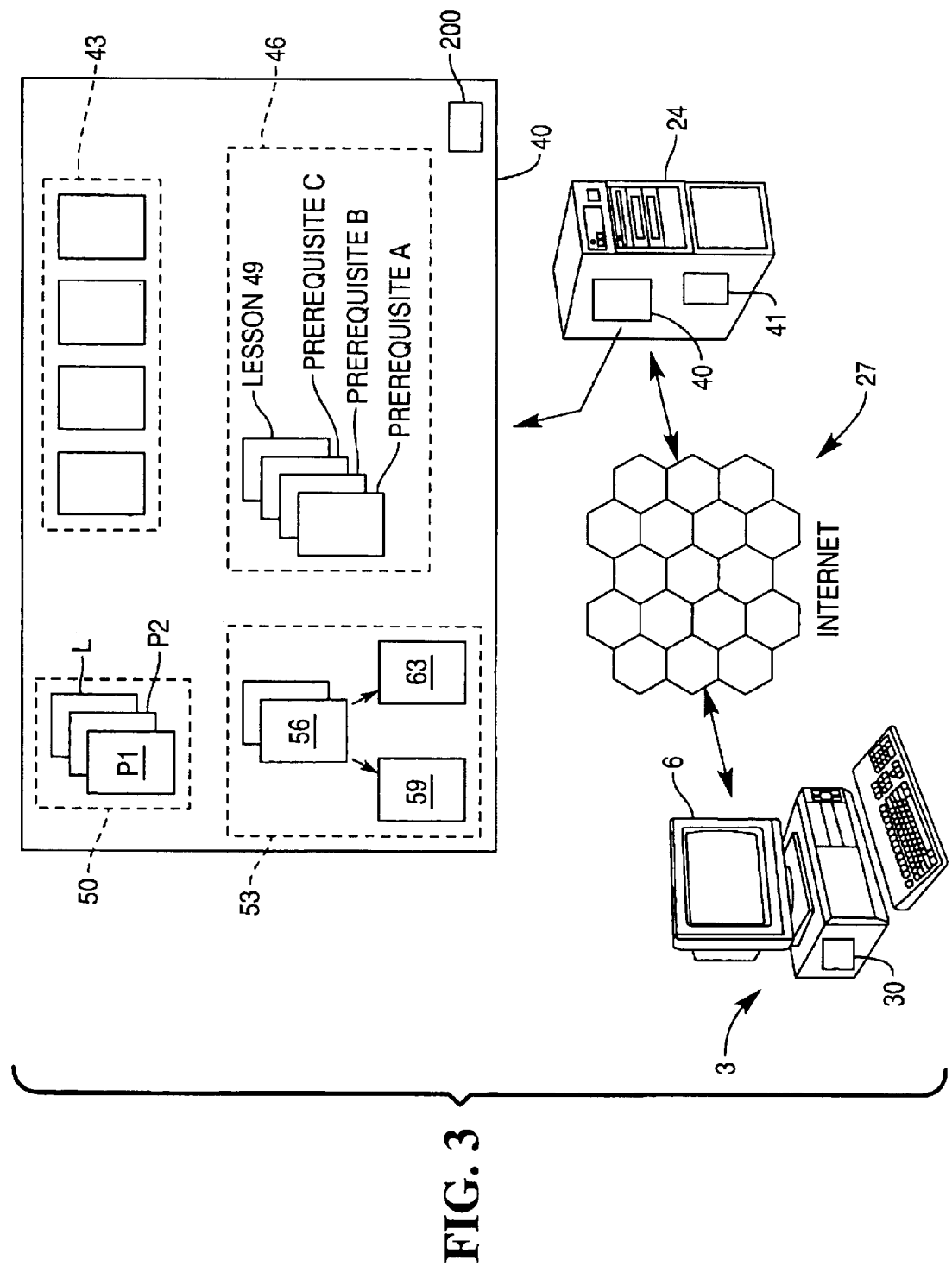
FIG. 3 illustrates another form of the invention.

FIG. 1 illustrates a computer 3 and a display 6, which are operated by a student (not shown). The display 6 presents a group of icons 9, each corresponding to a lesson of a standardized length of time, usually of short duration, i.e., less than 5 minutes.

In FIG. 2, when the student moves a cursor 15, controlled by a pointing device such as a mouse (not shown), over an icon, such as icon 9A, a brief description 17 of the lesson associated with the icon 9A is presented.

When the student selects an icon 9 in FIG. 1, the corresponding lesson is presented. Presentation of such lessons is known in the art, and the lesson preferably takes the form of a sequence of video images, resembling a 35 mm slide show or movie segment, accompanied by audio narration. Computer 3 is equipped with apparatus for presenting the audio component.

The lessons are not stored in the computer 3, but in one, or more, servers 24, shown in FIG. 3. The computer 3 of FIG. 1 is also shown, and communicates with the server 24 over a network 27, such as an internet. A significant characteristic of an internet is that it is a public-access, packet-switched network. However, under the invention, private packet-switched networks are also contemplated.

As an example of operation of the invention, assume that the subject under study by the student is elementary calculus. The lessons are grouped into Group 1 and Group 2. The student may select any lesson from Group 1, because no lessons in the group require special prerequisites or, stated another way, the student is assumed to have completed all prerequisites for the lessons.

Stated yet another way, a common feature of these lessons in Group 1 is that the conceptual content of each does not depend on that of another. They are independent bodies of knowledge. For example, Group 1 may contain lessons the lessons numbered (1), (2), (3), and (7) below:

(1) real numbers, sets, and inequalities,
(2) absolute value,
(3) coordinate planes, including distance and graphs,
  (4) slope of a line,
  (5) equations of straight lines,
  (6) circles and equations of the form y=a*x(squared)+b*x+c,
(7) functions,
(8) graphs of functions,
  (9) operations on functions,
(10) limits,
(11) continuity,
(12) limits and continuity of trigonometric functions.

These lessons (1), (2), (3), and (7) are conceptually independent, and do not depend on each other. In contrast, as will be explained below, some aspects of calculus are not independent. For example, a student should understand differentiation of functions, as that term is used in calculus, before attempting an understanding of the "chain rule." One reason is that the chain rule involves application of differentiation.

In the list given above, the lessons numbered (4), (5) and (6) rely on lesson (3) as a prerequisite; and the lessons numbered (8) through (12) rely on lesson (7) as a prerequisite.

Therefore, Group 1 may contain lessons (1), (2), (3), and (7). Group 2 contains two sets of lessons: lessons (4) through (6) and lessons (8) through (12). A student may select any lesson from Group 1, but may not select lessons from Group 2 until the prerequisite lesson in Group 1 has been completed.

The student is not allowed to take a lesson until the student has completed the prerequisites for the lesson. Consequently, no icons 9 in FIG. 1 are displayed as selectable for such non-allowed lessons.

When the student selects a lesson, the server 24 in FIG. 3 transmits the appropriate data packets, addressed to the appropriate Internet Service Provider, ISP, for delivery to computer 3.

At least two types of ISP are possible. The computer 3 may be connected to its own ISP, as would occur if the computer 3 is operated by a large company or university, which generally act as their own ISPs. Alternately, if computer 3 is operated by an individual, the individual will generally subscribe to a commercial, public-access ISP.

Software 30, running on the computer 3, receives the packets, and presents the lessons. When a received packet becomes exhausted, because its content has been shown, the software 30 transmits a message to the server 24, asking for a new set of packets.

If significant amounts of data are required, as when the lessons include detailed graphical images, or high-resolution video images, the data transfer can be undertaken in the background. That is, when sufficient data is received to support a video sequence and its accompanying narration, if present, then the sequence-and-narrative are presented. During that presentation, the software 30 continues to receive additional data, for upcoming frames and their narration.

As explained above, a significant feature of the invention is that the student is allowed to choose, to the extent allowable, which lessons the student wishes to complete, on any given day. That is, a given academic course is designed to contain a collection of lessons, some of which must be taken in sequence. For example, a university semester is commonly 16 weeks in length. A given course may meet for three 50-minute periods per week, for a total of forty-eight 50-minute periods. The invention may present the corresponding course as forty-eight 50-minute lessons.

However, the invention divides the lessons into two groups: Group 1: lessons which are mutually independent as to content, and Group 2: lessons which are sequential, that is, depend on other lessons, or each other, as prerequisites. The invention displays an icon for each independent lesson, and an icon for the prerequisite of each sequential set of lessons. Block 40 in FIG. 3 illustrates this type of display.

Block 40 represents the lessons stored within server 24, but can also represents the icons displayed on display 6. Group 43 represents the icons for the mutually independent lessons. The student can select any of these at any given time, and selection causes the server 24 to transmit the lesson content, over the network 27.

Group 46 represents a sequence of four lessons. The final lesson 49 requires three prerequisites, namely A, B, and C, as indicated. Prerequisite A must be taken first, then B, then C, and then finally the lesson 49. The student is prohibited from taking the lessons out-of-sequence, by software 30 running in computer 3, or software 41 in the server 24.

Group 50 represents a three-lesson sequence, having two prerequisites P1 and P2 and a final lesson L. Group 53 represents another three-lesson sequence. However, lesson 56 allows two alternate prerequisites, namely, 59 and 63. Either prerequisite qualifies the student for lesson 56.

Icons for lessons which are available to the student are displayed in a manner which clearly indicates that their selection is possible, as by display in a specific color, while "graying out" icons which are not available. Alternately, only icons for lessons which are available are displayed, and icons for non-available lessons are not displayed at all.

As the student completes lessons, the student passes milestones, and becomes eligible to take additional lessons. For example, when the student completes prerequisite A for lesson 49, prerequisite B becomes available. Prerequisite B is then added to the display 6, or highlighted if already present, depending on the display convention utilized.

In addition, as the student passes milestones, or thresholds, it may be desirable to remove the icons for lessons completed. One reason may be to obtain space on the display 6.

The preceding arrangement allows students latitude in selecting the specific lessons which they wish to pursue at a given time. However, it may sometimes be necessary to require all students to follow a common lesson at specific times. For example, it is likely that mid-term examinations will be held at a fixed time for all students, to discourage cheating. As another example, a guest lecturer may deliver a lesson by video conference, and will only be available at a specific time, although recordings of the lecture may be made available later.

Consequently, software, either running on the computer 3 or server 24, or both, is given a list of the fixed, deterministic events, and monitors the calendar date and time-of-day, to watch for the arrival of the events. When the events arrive, at that time, the invention precludes all involved students from working on lessons other than the mandated common lessons.

In practice, a notice will be posted on each student's display 6, beginning at midnight on the date of the mandated lessons. That notice identifies the lesson, and specifies the times during which no other lessons will be allowed. During those times, the server 24 is programmed to refuse to transmit any lesson packets to computers. In addition, the server 24 may be programmed to refuse to allow initiation of a lesson within, say, fifty minutes of the start of the mandated lesson.

During the time of the mandated lesson, the mandated lesson is presented to all computers 3, by transmission of the appropriate packets by server 24, or by video conference, or both.

In one embodiment, on the day of the mandated lessons, all lessons may be required to begin at specific times. That is, assume that the mandated lesson is scheduled to begin at 2:00 pm. If a person began an ordinary 50-minute lesson at 1:30, that person will not be able to finish the lesson, because, as stated above, the server will not transmit packets after 2:00, and the lesson, having started at 1:30, would ordinarily end at 2:20. Thus, no lessons will be allowed to begin, if it cannot be completed prior to the beginning of the mandated lesson.

FIG. 3 illustrates a single computer 3, but that computer 3 is taken as representative of a plurality of computers, each of which is operated by a different student.

Flow Chart

Figure 4:
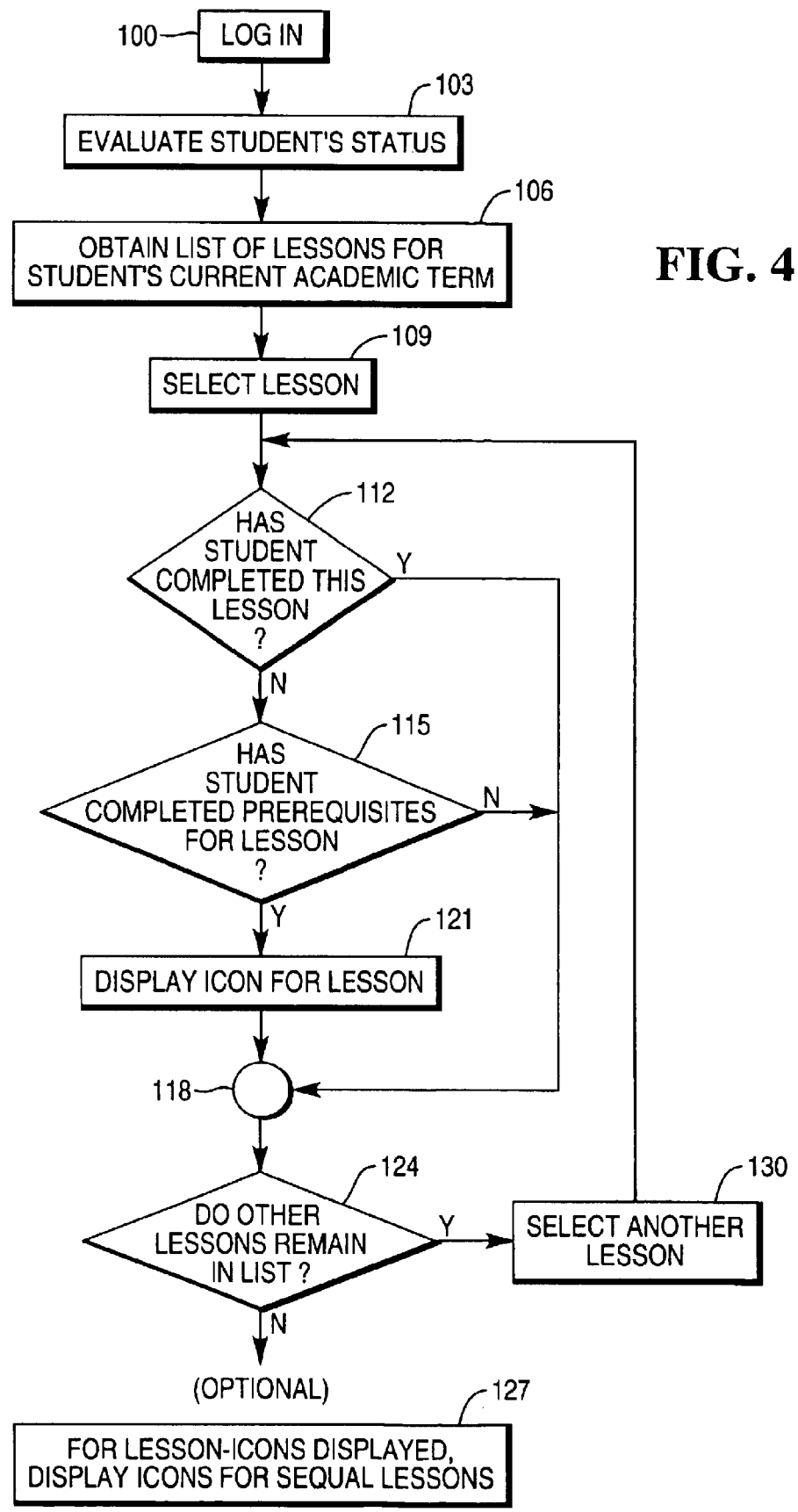
FIG. 4 is a flow chart illustrating procedures undertaken by one form of the invention.

FIG. 4 is a flow chart of procedures undertaken by one form of the invention. Block 100 indicates that a student utilizing a computer 3 is identified to server 24, as by a normal log-in process. Block 103 indicates that the student's status is evaluated. This evaluation step includes an assessment of the lessons completed by the student. Block 106 indicates that a list of the lessons to be completed in the student's current academic term is obtained. Consistent with the example given above, for a student taking four one-semester courses, this list will contain 4×48, or 192, lessons.

The invention examines all lessons, and selects those to be represented by displayed icons. To this end, block 109 selects an icon. Decision block 112 inquires whether the student has completed the lesson. If not, decision block 115 is reached, which inquires whether the student has completed the prerequisites for this lesson. If not, junction 118 is reached. If so, block 121 displays an icon for the lesson.

Decision block 124 inquires whether other lessons remain on the list. If so, the process returns to block 112, until the list is exhausted.

When the list is exhausted, the NO branch is taken from block 124. Block 127, which is optional, displays icons representing lessons which are sequels to available lessons. For example, in FIG. 3, lesson 49 is a sequel to PREREQUISITE C, which itself is a sequel to PREREQUISITE B, which itself is a sequel to PREREQUISITE A. These blocks will be highlighted, or grayed, as described above.

Therefore, under one form of the invention, block 40 in FIG. 3 represents a data structure indicating how lessons are organized in storage, and also indicates how icons representing the lessons can be displayed. When an icon is selected by a student using computer 3, the corresponding lesson is transmitted to computer 3, for presentation to the student.

Not all icons can be selected. Only the icons which represent lessons available to the student are allowed to be selected, and those are represented in a specific manner, as by a specific color. Such icons would include, for example, lessons for which the student has completed prerequisites. Such icons would not include, for example, lessons which the student has already completed, or lessons for which the student has not completed prerequisites. The non-included icons can be displayed in a different color from the allowed icons, can be grayed out, or can be eliminated from display altogether.

As the student progresses and completes lessons, the invention modifies the icons displayed accordingly, using the processes illustrated.

Single Framework

The discussion above indicated that a single instance of software can present multiple different lessons, as opposed to multiple instances of software, each designed for a different lesson. The invention can utilize the latter, but the former is preferred.

Figure 5:
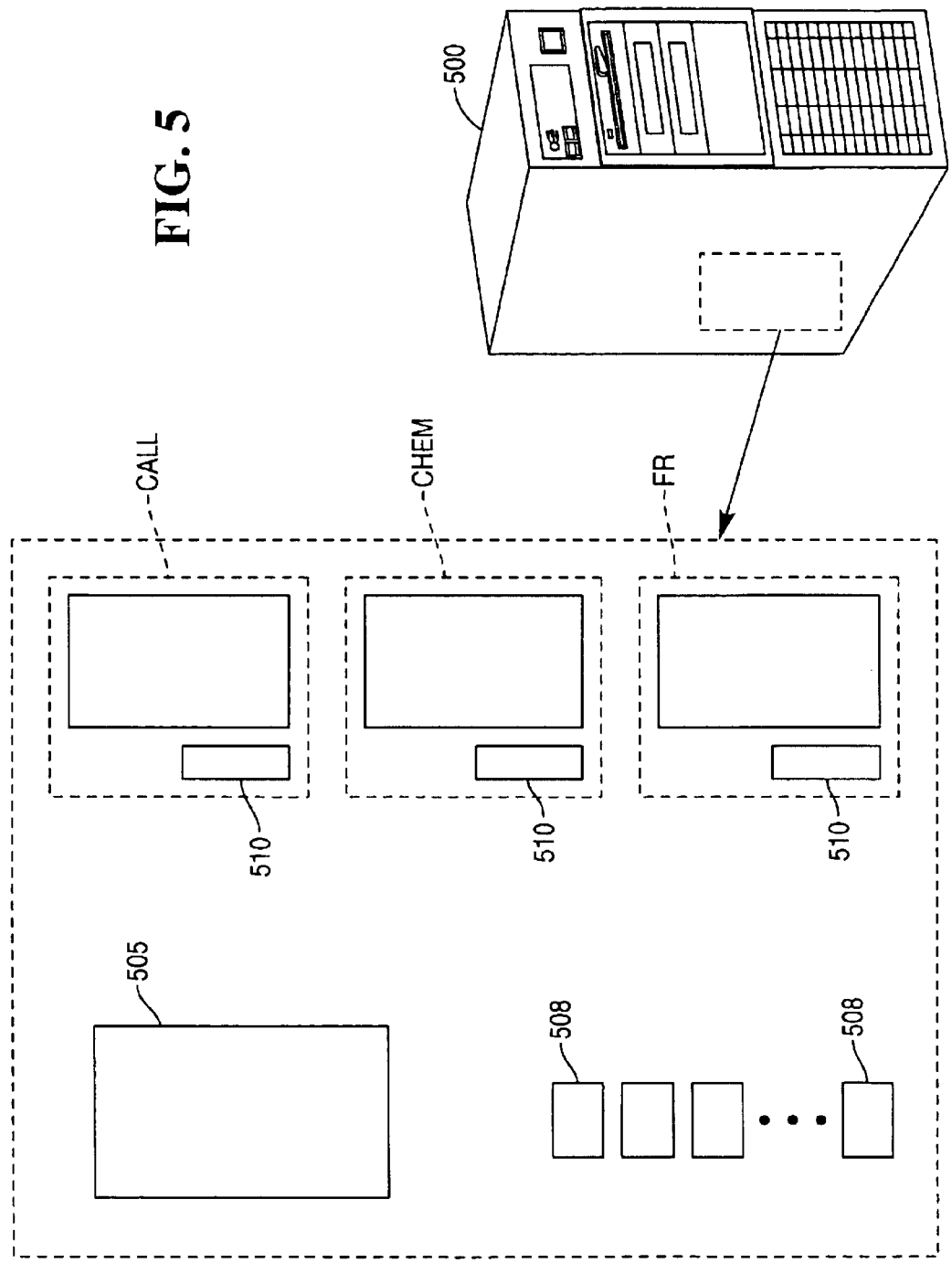
FIG. 5 illustrates one form of the invention.

For example, that single instance would handle all the lesson-sets, such as Calculus I, Chemistry I, French I, and the individual lessons within them, described above. FIG. 5 illustrates a server 500 containing software 501, and three exemplary lesson packages, namely, calculus, CALC, chemistry, CHEM, and French, FR, together with the software-framework 505 which presents the lessons, and performs the functions described above.

The framework 505 can be designed to operate in a single one of the following different modes exclusively, or be capable of operating in any selected mode. In a first mode, the single instance 505 may handle a single student at one time (as when a single student utilized the software on the student's own computer).

In a second mode, the single instance 505 can handle different students at different times, but only one student at any given time (as when a single computer in a school library would handle different students during the day).

In a third mode, the single instance 505 can handle multiple students at one time (as when a server handles multiple students logging into it, each student on a different computer or terminal).

In the first and second modes, the instances of software may be identical, since the identities of the students, and of the courses studied, will be the primary parameters which change. In the third mode, however, the instance of software will probably be different from that of the first and second modes, because of the complexity of the tasks required to be handled by the third instance.

However, once software is fully developed and tested, it costs almost nothing to copy it. Therefore, it is envisioned that, once the instance accomplishing the third mode of operation is developed to the developer's particular specification, it can then also be used in the other two modes. This is particularly to be expected when the software is developed by public funds.

Several features allow the single instance 505 to cooperate with the subject matter of the lessons, in order to attain selected goals of the invention. One is indicated by blocks 508 in FIG. 5, each of which represents a file, or data structure, which is generated and maintained for each student. That file is termed the student data model.

That file indicates the student's current status, in terms of courses and lessons already completed. A simple example of a student data model would be (1) a college student's current transcript, plus (2) a list of the courses currently being taken, and (3) a list of the lessons completed in the current term. That file may also indicate the future courses which the student is planning to take. Specifically included in the file are a list of the pre-requisite courses described above, which the student has mastered, and which allow the student to take sequel courses.

A second feature is that the lessons themselves are associated with a second file 510, or data structure, termed a course structure. For example, the Calculus lesson set would be associated with a file which indicates (1) the lessons which are circular, that is, which can be taken in any order, and (2) the lessons which require prerequisites.

In general, the second file 510 contains all information which allows the system to present the lessons in the necessary sequence, when a sequence is required, as explained above.

The software in question can be viewed as a generic "player," which presents audio-visual information, as described above, and also performs the structuring, or framework, functions described herein.

It is of course recognized that computer programs are often written as collections of modules, some of which can run independently of the others. The instance 505 can take the form of a collection of such modules, which cooperate together to perform the functions described herein.

It is emphasized that the student data models 508 and the course structures 510 are co-dependent in many cases. For example, when a student launches, or logs into, the framework 505, the framework 505 reads the student's data model 508. The framework then ascertains the courses, lesson sets, or other collection of lessons which should be made available to the student. For example, if the student's data model 508 indicates that the student is taking two particular continuing education courses, such as refresher-type courses for medical nurses, the framework 505 ascertains the identities of the two courses.

Next, the framework locates the lessons for the courses, and consults the course structures 510 for the courses. It is here noted that lessons are a sub-set of a course, and a course contains lessons. The course structures 510 indicate (1) which lessons are circular; (2) which are pre-requisites for others, and so on, as described above.

The framework 505 then determines the options to display to the student. This determination will depend on several factors, and those factors are largely system-dependent: the detailed implementations in two different systems will be different, but the overall approach will conform to the following general principles.

The framework must determine, at any given time, what options to present to the student. That determination will be made based on the student model 508 and the course structure 510. For example, the courses available to the student will first be identified. Those will be the courses for which the student is registered, and will be listed in the student model 508.

Also, the completed lessons in each course will be identified. Those completed lessons, together with a list of the pre-requisites for other lessons, obtained from the course structure 510, will indicate sequel-lessons which are available to the student. Other factors, described above, will be considered, if necessary.

For example, as explained above, the number of available lessons displayed to the student may be restricted, to avoid clutter on the screen. This number will be chosen by the system administrator, or professor who designed the lessons. This number will be a subset of the total number of lessons in a course. Suitable numbers of lessons for display are any integer from one to twenty.

Then the framework 505 displays the options available to the student, as in FIGS. 1 and 2. As the student completes the current lessons, the student model 508 is updated, and the display is modified accordingly.

It is observed that the student data model 508 need not be stored in the system, but can be carried by the student, as in smart-card format.

Additional Considerations

1. In one embodiment, the software 30 in FIG. 3 precludes copying of the lesson content to a storage device associated with computer 3. This preclusion will inhibit bootlegging of the lessons. Software 30 only allows display of the lessons on display 6 in FIG. 3, together with presentation of the audio narration.

2. While the discussion above focused on a traditional semester-type of education, the invention is particularly applicable to continuing education programs, industrial education, and professional training.

3. An optional icon 200 in FIG. 3 may be provided. That icon, when actuated, causes the display 6 to present one, or more, video frames which indicate the student's present status. For example, if the student is taking four semester courses, of 48 lessons each, 48×4, or 192 blocks B may be presented, on one, or more, screens. Each block represents a lesson. Blocks representing lessons which have been completed are presented in a specific color, such as green. Uncompleted blocks are presented in another color, such as gray.

3. A provision for review, and repetition, of completed lessons is made available. For example, if a student wishes to review the first lesson of a course, the person identifies that lesson, as by selecting that lesson from the screens displayed in point number 2, immediately above. The invention inquires whether the student has completed that lesson and, if so, presents the lesson again.

4. Assessment of the student's current status was discussed above. One element which can be used in the assessment can be a trace of the student's path through the materials presented by the professor. Such a trace is commonly called a "clickstream."

For example, if a student in a Chemistry course repeatedly returns to a lesson which explains the concept of Avogadro's number, it may be assumed that the student is weak in that concept, and that remedial teaching is required in that, or a related, topic.

Numerous substitutions and modifications can be undertaken without departing from the spirit and scope of the invention. What is desired to be secured by Letters Patent is the invention as defined in the following claims.

What is claimed is:

1. In a method of presenting educational lessons on a display, the improvement comprising:
   a) making an assessment of the educational standing of a person utilizing the display;
   b) selecting a list of lessons available;
   c) based on the assessment, identifying lessons available to the person and displaying corresponding icons on the display; and
   d) accepting selection of an icon from the person, and presenting the chosen lesson;
   wherein some courses on the list are not represented by icons.

2. Method according to claim 1, wherein the educational standing is measured by number, type, or both number and type, of lessons completed.

3. Method according to claim 1, wherein the student takes a path through materials available for examination and educational standing is measured at least once by reference to the path taken by the student through materials available for examination.

4. Method according to claim 1, wherein the step of presenting a lesson comprises transmitting information over a network.

5. Method according to claim 4, wherein the network comprises a public-access, packet-switched network.

6. Method according to claim 1, wherein some courses on the list are represented by icons, but selection of such icons causes no display of a corresponding lesson.

7. A system, comprising:
   a) a computer system, which includes presentation means for presenting audio-visual information to students;
   b) multiple, different courses, stored in the computer system, each comprising a collection of lessons;
   c) for each student in a group, a student data model, which contains information describing the student's educational status;
   d) for each course, a course structure file, which indicates
      i) which lessons in the course can be taken by the student without restriction, and
      ii) which lessons require prerequisite courses be taken first;
   e) framework software means for
      i) identifying a student,
      ii) examining (1) that student's data model and (2) the course structure, and,
      iii) based on the examination, making a determination of options to display to the student, and
      iv) displaying the options.

8. Method according to claim 1, and further comprising the steps of (1) detecting the arrival of predetermined periods in time and (2) during said periods, refraining from making lessons available to the display.

9. A system, comprising:
   a) means for presenting icons on a display;
   b) means for detecting selection of an icon and, in response, presenting educational lessons on the display;
   c) means for ascertaining whether a student of the lessons has reached a predetermined level of education and, if so,
      i) presenting additional icons on the display; and
      ii) removing other icons from the display.

10. A system, comprising:
    a) a storage device for storing educational lessons, in computer-readable format, each lesson comprising at least one sequence of video frames;
    b) a server computer, having access to the storage device;
    c) first software means, running on the server computer, for transferring a data packet to a remote computer,
       i) said data packet containing a set of lesson-icons, each of which, when actuated, delivers signals to the server computer, causing the server computer to retrieve a respective lesson from the storage devices, and transmit the lesson to the remote computer, and
       ii) said first software means utilizing a public-access, packet-switched network to transfer the packet;
    d) second software means, running on the server computer, for determining whether a person participating in a lesson at the remote computer has achieved a predetermined educational background and, if so, transferring additional lesson-icons, which induce transfer of additional lessons.

11. System according to claim 10, and further comprising
    e) a plurality of remote computers, each of which is operated by a different student, and
    f) a plurality of displays, one associated with each respective remote computer,
       i) each display of which presents a collection of icons representing courses available to the respective student, and
       ii) the content of each collection is determined by the first software means, or the second software means, or both.

* * * * *